UNITED STATES PATENT OFFICE.

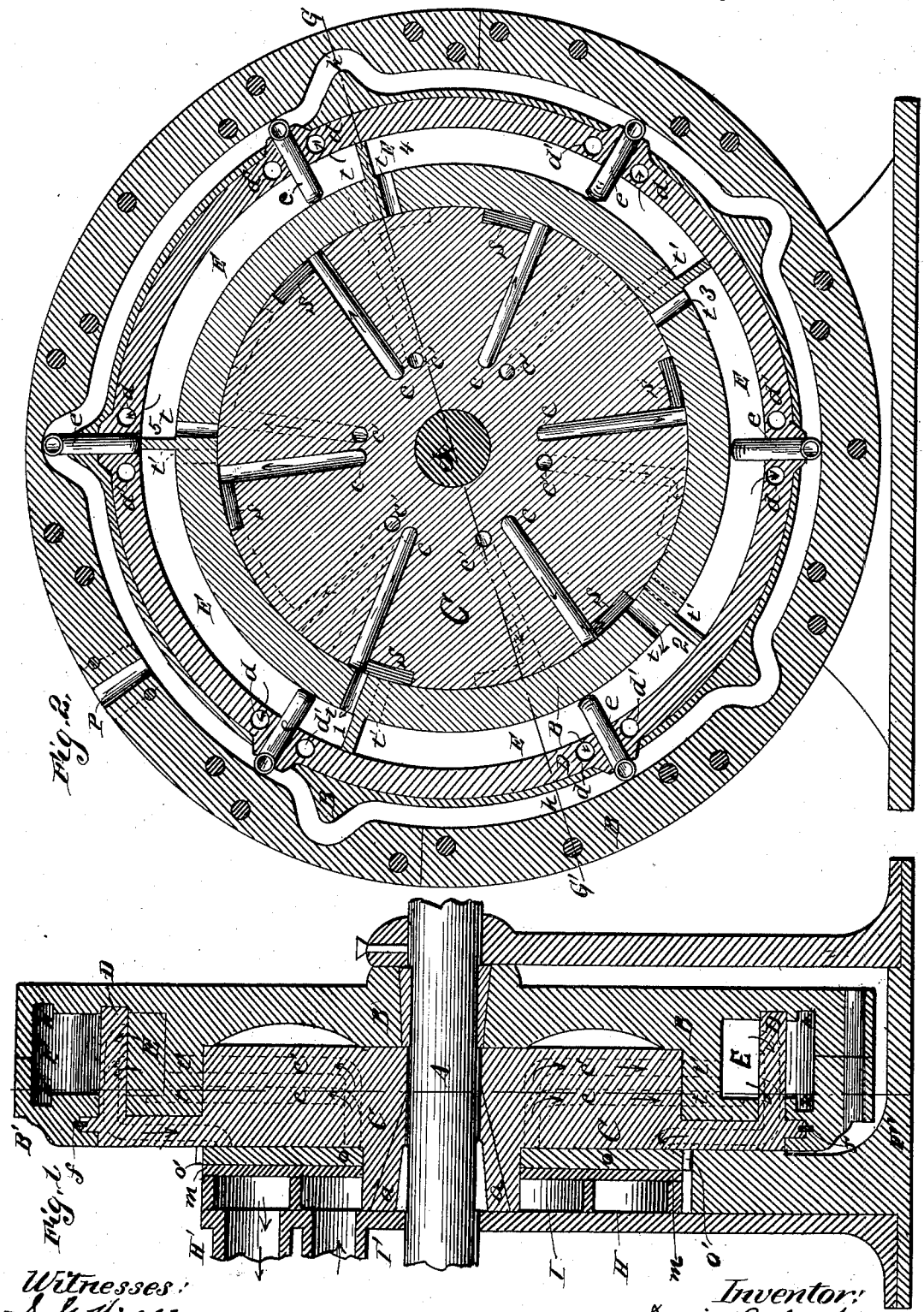

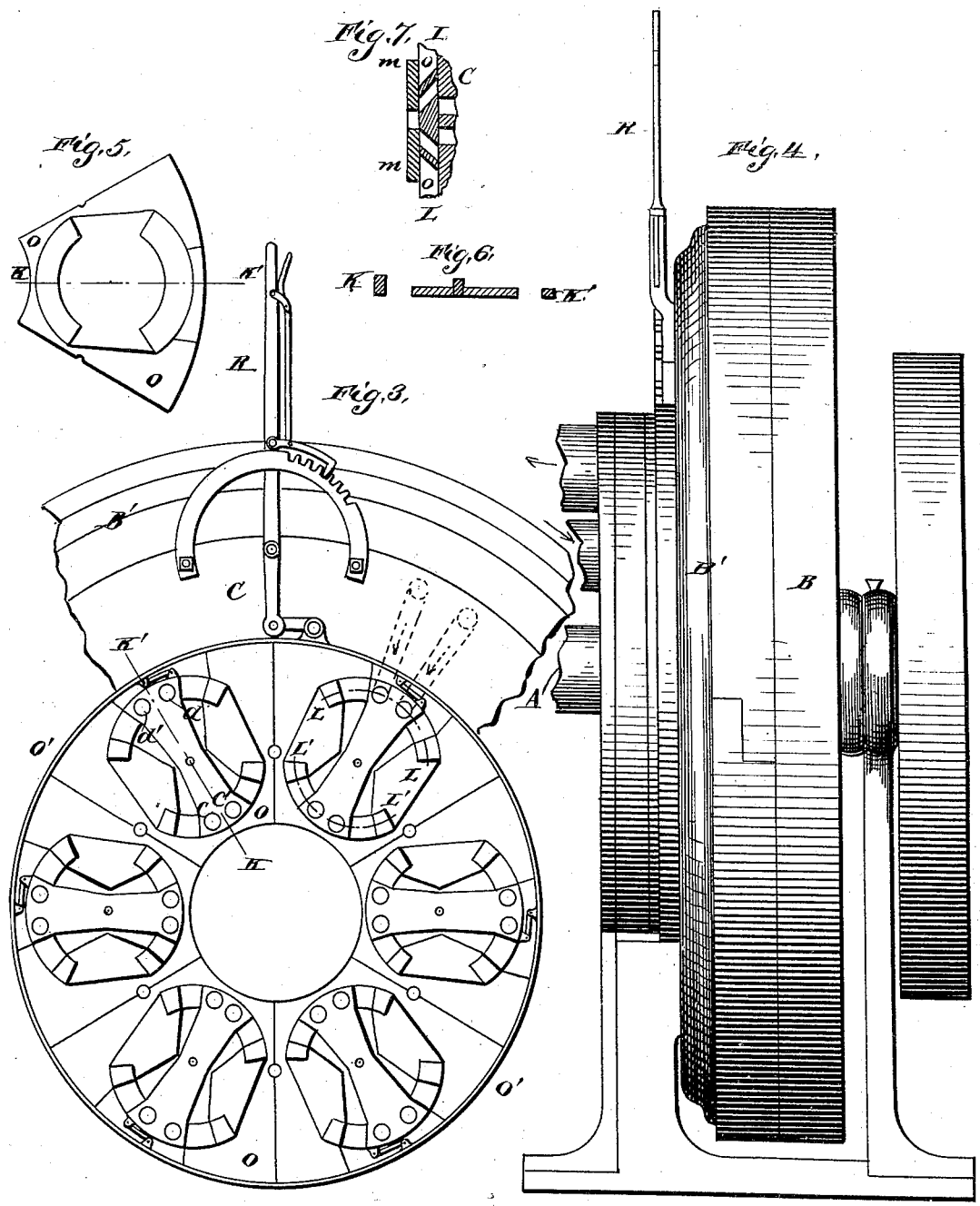

DANIEL B. COOK, OF SUPERIOR, WISCONSIN, ASSIGNOR TO THE COOK ROTARY ENGINE COMPANY, OF WISCONSIN.

ROTARY ENGINE.

SPECIFICATION forming part of Letters Patent No. 604,709, dated May 24, 1898.

Application filed March 8, 1897. Serial No. 626,419. (No model.)

*To all whom it may concern:*

Be it known that I, DANIEL B. COOK, a citizen of the United States, residing at Superior, in the county of Douglas and State of Wisconsin, have invented a new and useful Rotary Engine, of which the following is a specification.

In my invention the ratio of the live steam used to that of its expansion may be as one to ten, (1 to 10,) as nine to ten, (9 to 10,) or any intermediate ratio desired. The forces of the direct steam-pressure and of the expansive steam-pressure act constantly in the required proportions upon a given surface always at right angles to and at a fixed distance from the axis of revolution, thus yielding the maximum amount of work to be obtained by the action of a given force through a given distance. From the accompanying drawings it can be readily seen that its application is practical and desirable wherever expansive motive force is required—from a bicycle to a locomotive, from a sewing-machine to a flouring-mill, from a pleasure-yacht to an ocean-steamer. From its compact form of construction there is great economy in the space required for its operation, as well as in the cost of construction, and since a maximum amount of work is produced by this engine from any given amount of energy expended it follows that there is a large economy in the use of fuel. Hence the great advantage offered by my invention as a marine engine.

Similar letters and numerals refer to similar parts in all figures.

In the accompanying drawings, which illustrate my practical rotary engine, Figure 1 represents a cross-section of the engine through the axis and in the plane of the line G G', as shown in Fig. 2. Fig. 2 represents a vertical section of the engine at right angles with the axis, as shown in line F F', Fig. 1. Fig. 3 shows the attachment of the lever R and its ratchet to the core C, also the valve-ring o' o' and the valves L L', &c., the valve-plates o o, &c., and the link connection between the lever, lever-ring, and valves. Fig. 4 shows the elevation of the engine complete with belt-wheel attached. Fig. 5 shows the plan of the valve-plates which hold the valves in position, together with the sectional arcs in which they oscillate. Fig. 6 is a cross-section of the valve-plate on the line K K' of Fig. 5. Fig. 7 represents a section of the valve at K' with a portion of the core C and of the side of the exhaust-chamber between which the valves operate.

A, Figs. 1 and 2, is the axle or driving-shaft of the engine, to which the motor-wheel B, as shown in both Figs. 1 and 2, is rigidly attached.

In Fig. 1, *a a* represent a conical collar which is keyed to the axle and revolves with it and may be driven in toward the motor-wheel B, Fig. 1, to "take up the slack" caused by wear, as occasion demands.

The letter C in both Figs. 1 and 2 represents the "core" of the engine, with the projecting cylindrical sleeve D D of the engine. A projection from this core acts as a support to the motor-wheel B when used as a stationary engine and as a part of the engine-frame when used as a locomotive-engine, in which case it is only necessary to project a flange from the outer surface of the motor-wheel B at the proper distance from its outer face. The core C also furnishes passages through which the steam is conducted from the steam-chest I I', Fig. 1, to the expansive chambers of E E, &c., in Fig. 2, as shown by the cylindrical passages and arrows at 1 and 2, Fig. 2, and E E' of the motor-wheel B, Fig. 1, and by the dotted lines and cylindrical passages *c' c'*, &c., and *c c*, Fig. 2, *c' c'* being used when the engine is reversed. The projecting cylindrical sleeve D, Figs. 1 and 2, projects nearly through the motor-wheel B, Fig. 1, and carries the automatic partitions *e e e*, &c., Fig. 2. It also furnishes passages, as shown in D D, Fig. 1, by the dotted lines and arrows and in Fig. 2 by the circular openings *d d'*, &c., for the discharge of the steam after using in the expansion-chambers of E E, &c., into the exhaust or condenser H H', Fig. 1. This sleeve D also forms the outer covering of the chambers E E, &c. The inner surface and sides of these chambers, as well as the ends or fixed radial partitions 1, 2, 3, 4, and 5, Fig. 2, are rigidly attached to and form part of the motor-wheel B, as shown at E and E', Figs. 1 and 2.

Packing can be introduced in all edges of the motor-wheel B, bounding the steam-chambers E E, &c., and coming in contact with the projecting sleeve D D, Figs. 1 and 2, and also into the inner edge and sides of the automatic partitions e e, &c., rendering these chambers steam-tight. The ring f f, Fig. 1, shows the location of a single packing-ring, which will prevent any escape of steam from the motor-wheel B except through the exhaust-passages left open for that purpose. Small lubricating-ducts can be introduced at any point desired.

The parallel and irregular reverse-curved slots on each side of the inner surface of the outer rim of the motor-wheel B, as shown at h h' in both Figs. 1 and 2, is one of the important features of this invention, inasmuch as the slot reverse curves, which connect the several segments of the main concentric circle, are placed outside the space occupied by the sleeve D and in such a position as to be bisected by the plane of the radial partitions 1 2 3, &c., as shown in the construction of the motor-wheel B, Fig. 2. A small cylindrical projection from each corner of the outer edge of the several automatic partitions e e, &c., (shown in Fig. 2,) project into these grooves or slots, and since the rim bearing these slots and the partitions 1 2, &c., which help to form the chambers E E, &c., are rigidly attached or cast together they revolve together, and the automatic partitions e e, &c., are forced outward at the proper moment for the passage of the various fixed partitions 1 2 3, &c., and return immediately behind them, thus forming an expansion-chamber within the chambers E E, &c., between the two partitions, one of which, e e, &c., is held in a fixed position by the sleeve D, and the other, 1 2 3, &c , revolving under the pressure of the steam with the motor-wheel as the steam enters the ports t t, &c., or t' t', &c., when the reverse motion is required, all of which is shown in Fig. 2.

The cylindrical projections or lugs projecting from the outer corners of the automatic partitions e e, &c., parallel with the axis of rotation and acting in the slots h h and h' h', Figs. 1 and 2, are provided with small rings to reduce the friction, which can be readily replaced as often as required. The inner edge and sides of these partitions e e, &c., are provided with packing in order to be the more easily and perfectly adjusted, as the guides of the sleeve D and the slots h h h' h' hold them firmly in any of the positions which they assume during the revolution of the motor-wheel. The sleeve D is thickened at these points for this purpose, as shown in Fig. 2. These automatic partitions e e, &c., are so arranged with reference to the ports t t and t' t', &c., and the exhaust-ports d d and d' d', &c., that the pressure is entirely removed from them at the moment of their withdrawal from one chamber and their return to another. It will be noticed that the exhaust-passages d d, &c., are used with the receiving-passages c c, &c., and that the passages d' d', &c., are used for the reverse motion with c' c', &c.

Fig. 3 shows the valve-ring o' o', Fig. 1, and its link connection with the double valve L L', &c., the inner end of which controls the entry of the steam to the motor-wheel from the steam-chest I I' and the outer end controls the exit of the steam from the motor-wheel to the exhaust-chamber H H', Fig. 1, the outer end or exhaust-valve being marked d' d and the inner end being designated c c', Fig. 3. Fig. 3 also shows the relative positions of the different valve-plates o o, &c., and a section of the core C, Fig. 1, with the throttle and reverse-lever R attached. Fig. 3 also shows the link connection to the valve-ring o' o' and also a portion B' of the motor-wheel B B', Fig. 1. The dotted lines and arrows at C, Figs. 1 and 3, show the course of the exhaust through C to the valve L L', Fig. 3. Fig. 5 shows the valve-plate o o, and Fig. 6 shows the cross-section of the same at K K', Figs. 3 and 5. Fig. 7 shows a portion of the core C, Figs. 1, 2, and 3 a cross-section of the valve L L', &c., Fig. 3; also, the circular plate M M, Fig. 1, through which the steam passes from the steam-chest to the valves L L', &c., Fig. 3, and the exhaust returns from the motor-wheel B through the valves L L, &c. Fig. 4 represents the engine with steam-chest and exhaust-chamber included; also, with a belt sheave or pulley attached to the main shaft.

It will be seen that the motor-wheel B B', Fig. 4, can also carry a belt when sufficiently extended to prevent the heat from injuring the belt or when the belt is otherwise protected from the heat generated by the steam; also, that the motor-wheel B B', Fig. 4, can be used in pairs as locomotive-drivers by attaching the core C, Figs. 1 and 2, to the frame or support of the boiler and projecting a flange around the motor-wheel at a proper distance from the outer face of the wheels, placing both on the same axle and connecting the steam-chest I I' with the boiler and the exhaust-chamber in connection with the smoke-stack or condenser.

From the above description and the accompanying drawings it is now apparent that when the lever R, Figs. 3 and 4, is in its present position and the valves are closed there is no connection between the steam-chest I I', Fig. 1, and the motor-wheel B, Figs. 1 and 2; but by moving the top of the lever R, Fig. 3, to the left an opening is at once established between the steam-chest I I' and the passages c c, &c., leading through the core C, to the expansive chambers of E E, &c., and also the passages from E E, &c., through the sleeve D and the core C to the exhaust-chamber H H are opened by means of the rotation of the valves L L and L' L', &c., Fig. 3, and the steam acts instantly through the ports t t, &c., forcing the elongation of the expansive chambers above described and the consequent rotation of the motor-wheel B and the shaft A by the action of the steam between the rotating partitions 1 2 3, &c., and the automatic partitions e e, &c., now held rigidly in position by the sleeve D and the concentric segments of the parallel slots h h', &c. By passing the lever R, Figs. 3 and 4, to the right a connection is established between the steam-chest I I' and the passages c c', &c., and the steam enters the expansive chambers of E E, &c., through the ports t' t', &c., and escapes through d' d', &c. The expansive chambers are thus formed on the opposite side of the partitions 1 2 3, &c., as shown in Fig. 2, and the motor-wheel is made to revolve to the right. It will be noticed that with this system of valve-and-lever connection the single lever R, Figs. 3 and 4, opens and closes the throttle and reverses the engine, and, further, that the pressure can never be placed upon one side of the partitions 1 2 3, &c., until it is removed from the opposite side. It is also apparent that the amount of steam used is controlled by the lever R in opening the valves part way or fully, and the length of the slots of c c c' c', &c., Fig. 2, determines the ratio between the direct and the expansive pressure used. It will also be seen that while the direct boiler-pressure is acting in some of the chambers constantly the steam is acting in others expansively, and the aggregate resultant force, acting on the wheel, is constant so long as the boiler-pressure and the throttle-opening remain the same. Any governor so arranged as to control the throttle will regulate the speed of the engine. It is also apparent that the number of chambers to be put in any given engine depends upon the size and power of the engine required and the kind of work to be performed, and when great speed is required the cross-section of the chambers can be lengthened and their depth made more shallow and the reverse curves of the slots lightened to correspond therewith. The cross-section of these chambers may be circular, elliptical, or rectangular. The form is immaterial so long as the automatic partitions are modified to correspond therewith; but there should always be at least one more automatic partition than chambers in the motor-wheel in order to secure successive and not simultaneous changes of the chambers, whereby I secure constant and not intermittent pressure upon the motor-wheel; and since the steam is always acting in more than half of the expansive chambers its reaction is extended over at least three-fifths of the inner surface of the sleeve D, a large portion of the load of the engine will be carried on the steam-cushion between the motor-wheel B and the sleeve D, and the shaft A will always be held against the side of its bearings opposite to the steam-cushion, which passes around in the sleeve in the opposite direction to the revolution of the wheel, thus causing the main shaft A to act as its own antifriction-roller, as it thus rolls around upon the entire inner surface of its bearings and does not slide or slip upon any portion thereof.

What I claim as my invention, and desire to secure by Letters Patent, is—

1. In a rotary engine, the combination of the main shaft A, the conical collar a, a; and the motor-wheel B, containing the concentric chambers E, E, &c., and provided with the parallel reverse-curve slots h, h', located in the wheel B, and outside of, and concentric and eccentric to the chambers E, E, &c., all of which are rigidly attached, and a stationary sleeve D, projecting into said wheel, completing the inclosure of the chambers E, E, &c., and bearing and holding in position the automatic partitions e, e, &c., which are actuated by said parallel reverse-curve slots h, h', revolving outside of said sleeve and thus causing the successive division of the chambers E, E, &c., into an expansive and a contracting chamber, substantially as specified.

2. In a rotary engine the core C, with the projecting sleeve D, and to which are rigidly attached the valve-plates o, o, &c., and the steam-chest I, I', and exhaust-chamber H, H', and in which revolves the main shaft A, which bears the motor-wheel B; said core and sleeve being also provided with ports and passages connecting the steam-chest I, I', and the exhaust-chambers H H', with the chambers E, E, &c., practically as specified.

DANIEL B. COOK.

Witnesses:
M. L. McMINN,
CHESTER C. PIATT.